United States Patent Office 2,842,576
Patented July 8, 1958

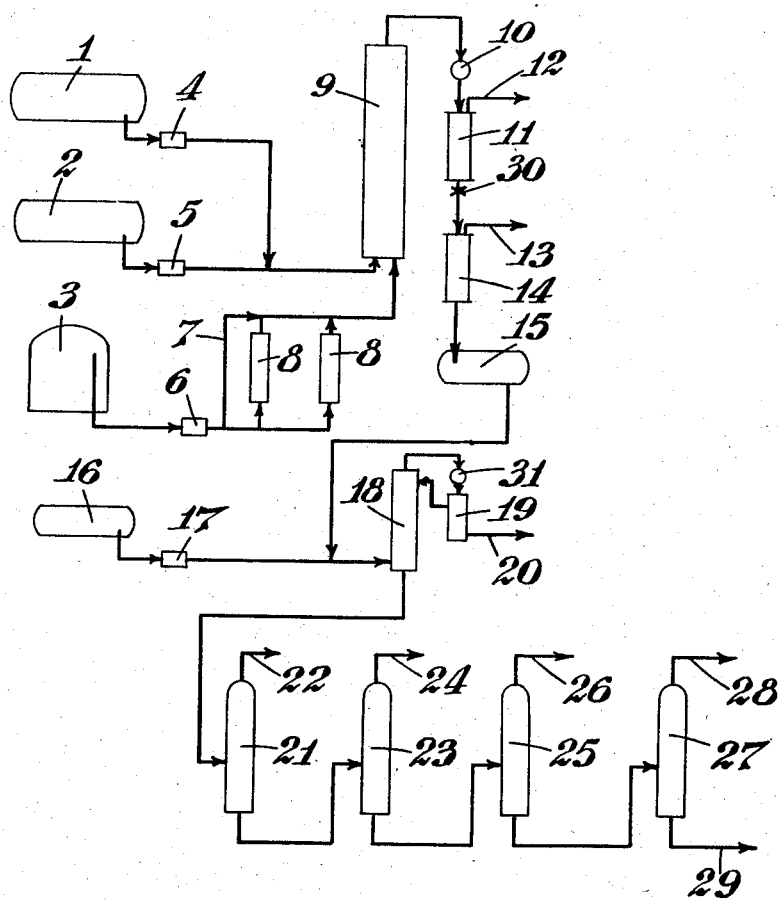
INVENTORS: John Habeshaw
Charles John Geach

2,842,576
PRODUCTION OF ACETALS

John Habeshaw and Charles John Geach, Sunbury-on-Thames, England, assignors to The British Petroleum Company Limited Application December 29, 1952, Serial No. 328,404

Claims priority, application Great Britain January 3, 1952

4 Claims. (Cl. 260—413)

This invention relates to the production of aldehydes and acetals.

It is now well-known that aldehydes may be produced from mono-olefins and carbon monoxide and hydrogen, in the presence of a catalyst, under suitable conditions of temperature and pressure, by the so-called Oxo synthesis reaction.

As feedstock to the Oxo synthesis reaction it is possible to use, in place of a simple olefin, an unsaturated organic compound containing also a functional group, but the yield of aldehydes obtained varies considerably according to the chemical nature of the feedstock. The poor yields which are frequently obtained are due in part to the occurrence of secondary reactions in the reaction zone, particularly polymerisation, and in part to difficulties of product recovery which is complicated by the unstable nature of the products. Attempts to reduce the activity of the aldehyde group present initially in unsaturated aldehydes, for example, by condensation of the aldehyde group with suitable reagents with subsequent treatment of the product under the conditions of the Oxo synthesis reaction, have not led to any marked improvement in the yields of the primary carbonylation product. Thus acrolein has been converted to its dimethyl and diethyl acetals but in the use of these materials as feedstocks to the Oxo synthesis reaction poor yields have been obtained on attempting to isolate the aldehydic product.

It has also been proposed to carry out the Oxo synthesis reaction in the presence of alcohols or glycols, so obtaining the aldehyde acetals as main products. This procedure usually leads to the formation of a mixture of the free aldehyde and the acetal, the subsequent product isolation being very complicated.

It is an object of the invention to provide a process for the production of aldehydes by the Oxo synthesis reaction, in the form of derivatives thereof which are recoverable from the reaction product in good yields. Other objects will appear hereinafter.

According to the invention, the above objects are accomplished by a process which comprises subjecting an olefinically unsaturated compound, having, in the molecule a functional group other than a free aldehydic group, together with carbon monoxide and hydrogen to the Oxo synthesis reaction in the presence of a mono-hydric or di-hydric alcohol and a cobalt catalyst, at elevated temperature and superatmospheric pressure, whereby, in said molecule, an aldehyde group is introduced at the double bond, thereafter, and usually prior to the separation of the normally liquid components of the product, reacting at least part of the product containing an aldehyde and an acetal with a mono- or di-hydric alcohol to convert the aldehyde to an acetal and thereafter subjecting the reacted product or part thereof to fractional distillation for the recovery of the acetal or acetals.

Preferred reaction temperatures for the Oxo synthesis reaction lie within the range 100–180° C. The preferred reaction pressure lies within the range 50–250 atmospheres and, more particularly 100–200 atmospheres.

Preferred non-aldehydic olefinically unsaturated compounds for use as feedstock to the Oxo synthesis reaction are unsaturated alcohols, for example allyl alcohol and crotyl alcohol; unsaturated acids, for example acrylic acid, methacrylic acid, crotonic acid and oleic acid; and unsaturated esters, for example ethyl acrylate, methyl acrylate, methyl methacrylate, ethyl methacrylate, allyl acetate, tetrahydro-benzyl acetate, tetrahydrobenzyl-tetrahydrobenzoate, the last compound being obtainable from $\Delta^3$-tetrahydrobenzaldehyde by the Tishchenko reaction. Othe compounds of this type are unsaturated ketones and unsaturated nitriles.

Any suitable mono-hydric or di-hydric alcohol which forms an acetal may be used in the Oxo synthesis reaction product or subsequently for the treatment of the Oxo synthesis product according to the invention. Although, if desired, different alcohols may be employed in these two stages, in general it is more convenient to use the same alcohol since product recovery is simplified. The term "alcohol" herein includes both aliphatic and cyclo-parafinic hydroxyl compounds.

Preferred alcohols are saturated aliphatic mono-hydric alcohols of 1–4 carbon atoms/molecule or di-hydric alcohols of 2–4 carbon atoms/molecule. Ethylene glycol and 1:3 butylene glycol have been found very suitable. Other compounds which may be employed include methanol, ethanol, propanol, n-butanol, iso-butanol, 1:3 propane diol and 2:3 butylene glycol.

Preferably the Oxo synthesis reaction is carried out in the presence of a solvent, preferably boiling below the acetal formed during the reaction and also below the boiling point of the acetal formed subsequently. Preferred solvents are hydrocarbons, such as low molecular weight paraffins; naphthenes, such as cyclohexane and methyl-cyclohexane; and aromatics such as benzene. Gasoline fractions, boiling below the boiling point of the acetal subsequently formed, are particularly suitable.

The acetalisation may be carried out without prior removal of a solvent of the type herein described. Water formed during acetalisation may be removed continuously in association with said solvent, by maintaining the mixture under conditions of reflux. After the acetalisation reaction is complete, the remaining solvent may be removed by distillation at atmospheric pressure and the acetal thereafter isolated by further distillation at reduced pressure, for example in the range 0.1 to 50 mms. of mercury pressure.

Any of a number of well known techniques for converting free aldehydes to acetals may be used for the treatment of the Oxo synthesis product. A modification of the method of Haworth and Lapworth (J. Chem. Soc., 1922, 79), using ammonium chloride as catalyst and refluxing with a low boiling solvent to entrain water from the reaction mixture has been found satisfactory. The low boiling solvents are preferably hydrocarbons or halogenated hydrocarbons (although ethers and other solvents can be used) boiling below about 100° C.

Usually the conditions for the conversion of aldehydes in the Oxo synthesis product to acetals will be found efficient for the simultaneous decomposition of cobalt carbonyls contained in said product.

If desired the acetal after separation from the reaction product may be converted to the corresponding aldehyde by known methods, for example, hydrolysis with dilute mineral acid, for example by heating to about 70° C. with 10% by weight hydrochloric acid.

The catalysts usually employed in the Oxo synthesis reaction have, hitherto, been solid cobalt-containing materials, a typical catalyst being one containing by weight 100 parts of cobalt, 5 parts of thoria, 9 parts of magnesia and 200 parts of kieselguhr. Solid compounds of cobalt such as cobalt basic carbonates, cobalt naphthenate and cobalt salts of fatty acids have also been employed, generally in conjunction with a solid porous reactor packing.

In the present process, the prefered cobalt catalysts for use in the Oxo synthesis reaction are cobalt carbonyls, introduced into the synthesis reactor in the liquid or gaseous phase. The term "cobalt carbonyl" is used herein with reference to true carbonyls having molecules consisting of cobalt atoms and the group —CO, such as $Co_2(CO)_8$ and to carbonyl hydrides, having molecules consisting of cobalt atoms, hydrogen atoms and the group —CO, such as $Co(CO)_4H$.

Cobalt carbonyls may be generated from any convenient source of cobalt, including cobalt metal, and readily obtainable cobalt compounds such as cobalt oxide, cobalt carbonate or basic carbonate or cobalt sulphide. When metallic cobalt is used it is advantageous that the metal be either finely divided or dispersed over a suitable supporting material such as pumice or kieselguhr. Cobalt oxide, and other solid compounds, may however, be used in suitably-sized lumps, in pellet form, or in any form convenient for charging to the vessel. Cobalt halides may be employed in the presence of a halogen acceptor, for example, metallic copper.

Cobalt recovered from products of the Oxo synthesis reaction may be coverted to a cobalt carbonyl for use as catalyst. It has also been found that cobalt which has been deposited in an Oxo synthesis reactor is a suitable cobalt material for use in the present process.

The cobalt compound employed in the production of the catalyst is usually subjected before use to reduction in the presence of hydrogen.

The catalyst may be prepared in the form of a solution by the use of any solvent which is inert to the said catalyst and which will not prevent the subsequent use of the catalyst in the Oxo synthesis reaction.

According to one method, the solvent and carbon monoxide may be pumped concurrently or countercurrently, over a fixed bed of the cobalt-containing material.

Suitable solvents have been found to be hydrocarbons such as xylene, paraffins or cycloparaffins, ethers, esters, alkanols, such as octyl alcohol.

It is particularly preferred when operating with these catalysts that the Oxo synthesis reactor be operated under continuous conditions without the introduction of cobalt compounds in the solid phase. The control of reaction achieved is in no small measure in consequence of the uniform rate of reaction which has been found to result from the introduction of the cobalt carbonyl catalyst in the liquid or gaseous phase. Notwithstanding the above, solid cobalt metal or compounds may be deposited in the reactor by decomposition of part of the cobalt carbonyl and do not detract from the efficiency of the process. This preferred method of operation includes within its scope a process in which cobalt in the solid phase is so formed in the reactor. Clearly also, the presence of small amounts of cobalt in the solid phase in the reactor when starting up the process will not materially effect operation and a continuous process, started up under the conditions lies within the scope of the preferred manner of operation.

Preferably the catalyst and olefin feed rates to the Oxo synthesis zone are adjusted to maintain the weight of cobalt (estimated as metal) between 0.01% and 5%, preferably between 0.05% and 2%, of the weight of the olefin feed to the Oxo reaction zone.

Cobalt contained in the effluent from the Oxo reaction zone may be recovered according to conventional practice in operating the Oxo reaction and if desired, recycled to the catalyst-generating zone. Thus the liquid product from the Oxo reaction may be passed over a porous material (suitably pumice, kieselguhr, silical-gel or active charcoal) at elevated temperatures in the presence of hydrogen whereby the cobalt is retained upon the porous material. The cobalt-containing porous material may then be treated in the catalyst-generating zone.

It has been found that the cobalt in the effluent from the Oxo reaction zone may be recovered without hydrogen treatment if the product is subjected to a temperature in the range 120°–250° C. and a pressure of 50–500 lbs./sq. in. for a period of time up to 10 minutes.

The increase in yield when operating according to the process of this invention is believed to result from suppression of condensation and/or polymerisation reactions which might otherwise occur in the Oxo reaction stage and also during the subsequent product recovery.

The invention is illustrated but in no way limited by the following example.

*Example*

Ethyl acrylate was reacted in benzene solution in the presence of ethanol, the feed mixture being 46.0 grams of ethyl acrylate, 34.4 grams of ethanol and 26.4 grams of benzene, with 0.12 grams of dicobalt octacarbonyl as catalyst. The Oxo synthesis reaction was carried out batchwise, the temperature being 125° C., the pressure 2000 lbs./sq. in. and the reaction time 3 hours. A conversion of 75 percent by weight of the acrylate charged was achieved. A mixture of beta-carbethoxypropionaldehyde and its diethyl acetal, distilling between 80° C./10 mm. and 85° C./4.5 mm. was obtained as main product, the yield being 80% of theory on the ester reacted, or 60% of theory on the ester charged. On converting the free aldehyde to the acetal with ethanol by the method of Haworth and Lapworth referred to earlier, the pure diethyl acetal was obtained, boiling at 85° C. at 4.5 mm., the yield being 80 percent of theory based on the ester reacted.

The invention is further illustrated with reference to the accompanying figure which is a flow diagram in respect of a process according to the invention, suitable for the conversion of ethyl acrylate to the diethyl acetal of beta-carbethoxypropionaldehyde.

Ethyl acrylate and ethanol are taken from the storage drums 1 and 2 by the pumps 4 and 5 respectively, mixed, and fed to the reactor 9. Water gas is taken from the holder 3 by the compressor 6 which raises the pressure to that required for the reaction. The compressed water gas is then fed through a bed of reduced cobalt oxide contained in the vessels 8, where volatile carbonyls are generated by reaction with the cobalt and water gas and entrained from the vessels 8 by the water gas feed stream, which passes to the "Oxo" reactor 9. In order to regulate the amount of cobalt passing to the "Oxo" reactor, a proportion of the water gas feed stream may be fed trough the by-pass line 7.

The products from the "Oxo" reactor pass through the cooler 10 to the high pressure separator 11 operated at substantially the same pressure as the "Oxo" reactor and from here unreacted gas is withdrawn by the line 12. This gas may, if desired, be recycled to the "Oxo" reaction stage. The liquid product from 11 is passed to the vessel 14 through a pressure let down valve 30 which reduces the pressure, preferably to a value in the range 100–200 lbs./sq. in. Gas separating from solution is withdrawn by the line 13 and may be passed to fuel, although if the pressure in 14 is relatively low, recovery of ethanol from this vent gas may be effected. The liquid product from 14 passes to the storage drum 15. This liquid comprises ethanol, the diethyl acetal of beta-carbethoxypropionaldehyde and the free aldehyde, as well as some unchanged ethyl acrylate and high boiling by-products of the reaction. Cobalt carbonyl is also present in this crude reaction mixture.

This product is fed to the acetal forming stage 18, where it is refluxed with ammonium chloride as catalyst in the presence of an entrainer for water. The entrainer, which may contain make-up ethanol, may be added from the drum 16 by the pump 17. The ammonium chloride used as catalyst may conveniently be added in ethanol solution, or may be introduced into 18 as a solid. This stage is operated at approximately atmospheric pressure and may be carried out continuously or batch-wise. The aqueous reflux from 18 is cooled in heat exchanger 31 and separated in the vessel 19, from which water containing some ethanol is removed by the line 20, benzene being returned to 18. The continuous operation of the stage 18 is similar to that of well-known continuous esterification methods. The completely acetalised product from 18 passes to the still 21, where excess entrainer is removed by the line 22 in the form of a mixture with ethanol and returned to the drum 16 for reuse. The residue from 21 passes to the still 23, where excess ethanol is taken overhead, cooled and passed back by the line 24 to the ethanol feed tank 2. Any unchanged ethyl acrylate is recovered from the residue of 23 in the still 25 and removed by the line 26. It is preferred that the conversion in the "Oxo" stage be maintained high, so that this unchanged acrylate is only a small proportion of that fed, since some direct hydrogenation usually occurs leading to the formation of ethyl propionate and this stream is not very suitable for recycle. The residue from this still 25 passes to still 27, where the main product is recovered as a distillate and passed to storage by the line 28. The bottoms from 27 are passed to storage by the line 29. These bottoms comprise high boiling by-products of the reaction and also cobalt compounds in solution. Cobalt carbonyl present in the product fed to 18 is decomposed in this step, forming cobalt compounds which are soluble in the reaction mixture. These cobalt compounds may be recovered, if desired, by acid extraction or alkali precipitation of the residue from 29. It is obvious that the operations effected in stills 21 to 23, 25 and 27 may be carried out by batch fractionation and this method would be preferred when the scale of operations was relatively small.

We claim:

1. In a process for the recovery and stabilization of the reaction products resulting from the Oxo synthesis reaction of an olefinically unsaturated compound selected from the group consisting of alcohols, acids, esters, ketones and nitriles, together with carbon monoxide and hydrogen in contact with an alcohol selected from the group consisting of monohydric alcohol and dihydric alcohol and a cobalt catalyst whereby at least one aldehyde and at least one acetal are formed, the improvement which comprises thereafter reacting at least a part of the product containing said aldehyde and said acetal with an alcohol selected from the group consisting of monohydric alcohol and dihydric alcohol to convert the aldehyde completely to acetal, and thereafter subjecting at least a part of the reaction product to fractional distillation and separation of at least one acetal.

2. The process as set forth in claim 1 where the alcohol used is methanol.

3. The process as set forth in claim 1 where the alcohol used is ethanol.

4. The process as set forth in claim 1 where the alcohol used is ethylene glycol.

References Cited in the file of this patent

UNITED STATES PATENTS

| | | |
|---|---|---|
| 2,491,915 | Barrick et al. | Oct. 20, 1947 |
| 2,533,276 | McKeever et al. | Dec. 12, 1950 |
| 2,542,767 | Gresham et al. | Feb. 20, 1951 |
| 2,549,454 | Gresham et al. | Apr. 17, 1951 |
| 2,610,203 | Hagemeyer et al. | Sept. 9, 1952 |
| 2,614,970 | Morrell et al. | Oct. 21, 1952 |
| 2,686,200 | Lo Cicero et al. | Aug. 10, 1954 |

FOREIGN PATENTS

| | | |
|---|---|---|
| 101,428 | Great Britain | Sept. 16, 1916 |

OTHER REFERENCES

Jour. Chemical Society, page 79 (1922), article by Haworth et al.